William E. Zrubek
INVENTOR.

United States Patent Office 3,456,201
Patented July 15, 1969

3,456,201
SYSTEM FOR MONITORING SIGNAL
AMPLITUDE RANGES
William E. Zrubek, Houston, Tex., assignor to the United
States of America as represented by the Administrator
of the National Aeronautics and Space Administration
Filed Dec. 3, 1965, Ser. No. 511,564
Int. Cl. H03k 5/20
U.S. Cl. 328—116                    5 Claims

ABSTRACT OF THE DISCLOSURE

A system for monitoring signal amplitude and indicating the proportionate time the signal is within discrete amplitude ranges. A first signal channel utilizes a Schmitt trigger with a preselected threshold level and a clock pulse source which are coupled through an AND gate to a counter. Whenever the signal exceeds the threshold, clock pulses are counted. Whenever the signal exceeds the threshold for a predetermined count within each interval of a series of intervals as defined by the pulse intervals of a second clock pulse source, the counter drives a flip-flop to provide an indicating output signal state. The counter is reset at the end of each interval with each pulse from the second clock. A reset circuit which includes a logical NOT circuit returns the flip-flop to its first state at each pulse of the second clock if an insufficient count has accumulated on the counter during the interval and only if during the interval the signal threshold had not been exceeded for the predetermined count. A second channel with an inhibit connection to the first channel provides an indicating output signal state when a different threshold value is not exceeded by the input signal for a predetermined percentage of time.

---

Figure 1:
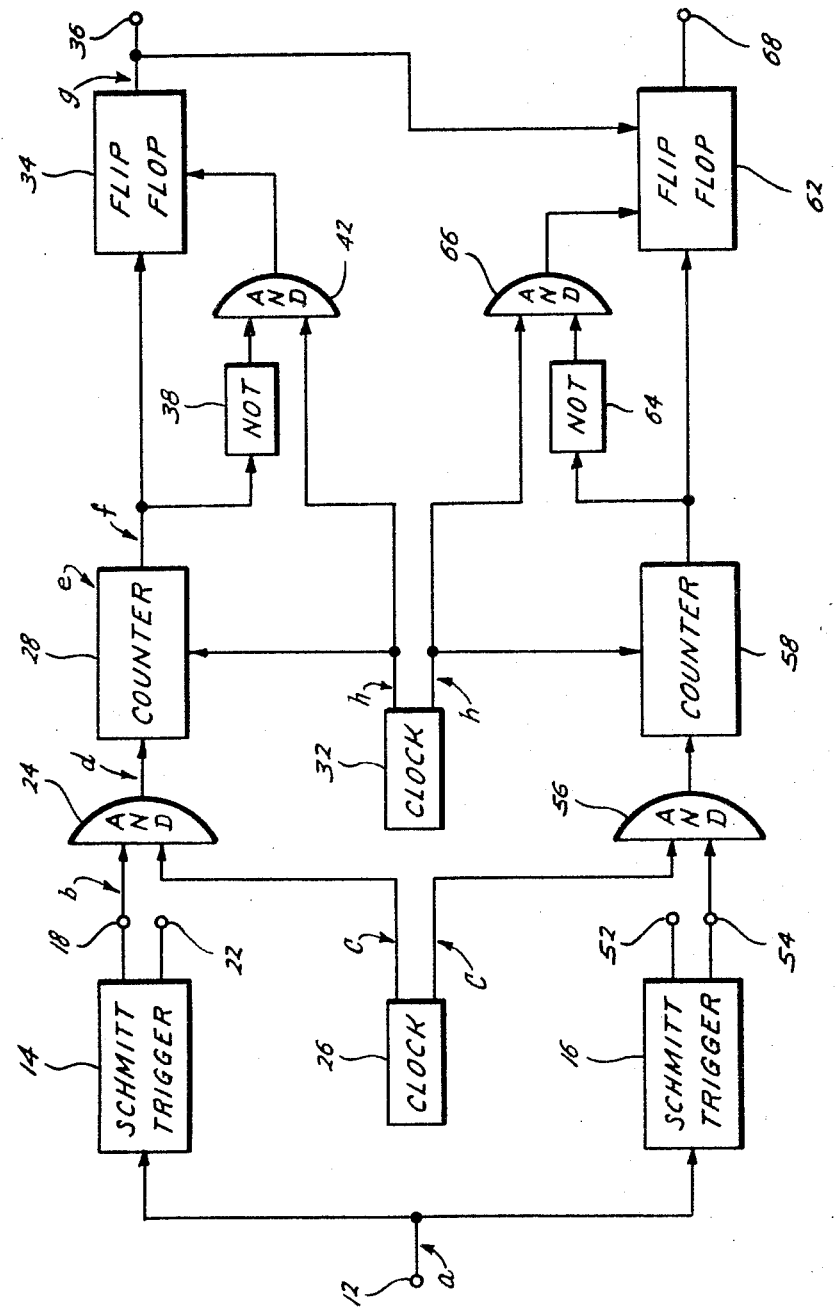

The invention described herein may be manufactured and used by or for the Government of the United States of America for governmental purposes without the payment of any royalties thereon or therefor.

This invention relates in general to signal monitor systems and, more particularly, to a system for examining the amplitude of a data signal periodically and producing an output signal indicative thereof.

When the characteristics of an electrical signal are not known, it is necessary to examine the signal so that the circuit, which will process such a signal, is able to utilize the signal with maximum efficiency. For example, in telemetry systems the amplitude of a data signal may be much lower or higher than expected, causing frequency deviations of a subcarrier oscillator which are lower than full scale or saturated, respectively. The output of the subcarrier oscillator may then result in an output signal having low signal-to-noise ratios, adjacent channel interference, and loss of information. Thus, preprocessing techniques must be employed to make optimum use of the available information.

In order to overcome the attendant disadvantages of prior art preprocessing systems, the signal monitor system of the present invention examines the amplitude of a data signal for a predetermined time interval. Output control signals are generated that depend on the signal amplitude. These output control signals are then used to control a preprocessing unit such as a subcarrier oscillator so that the incoming signal may be properly utilized.

More particularly, the system comprises a plurality of channels, each channel comprising a Schmitt trigger circuit having a distinct voltage level at which an output signal is produced. The output terminal of the Schmitt trigger is fed into one terminal of a first AND gate. A source of clock pulses is fed into a second terminal of the AND gate. When the Schmitt trigger produces an output signal, that is, when the voltage level of the input signal exceeds the threshold level of the Schmitt trigger, the clock pulses are allowed to pass through the AND gate and are counted on a counter connected to the output terminal of the AND gate. When a predetermined number of clock pulses are counted on the counter, the counter produces an output pulse. The output pulse of the counter is fed to a flip-flop circuit causing the flip-flop to change output states. A second source of clock pulses is also fed to the counter so that at the end of a predetermined interval, the counter may be reset. Further, the second source of clock pulses is fed to one input terminal of a second AND gate. The output of the counter is also connected to a logical NOT circuit so that if the counter has caused the flip-flop to change states during a previous time interval and if the predetermined number of pulses are not counted during the last time interval, the logical NOT circuit which is connected to a second input terminal of the second AND gate, causes the flip-flop circuit to be reset.

Figure 2:
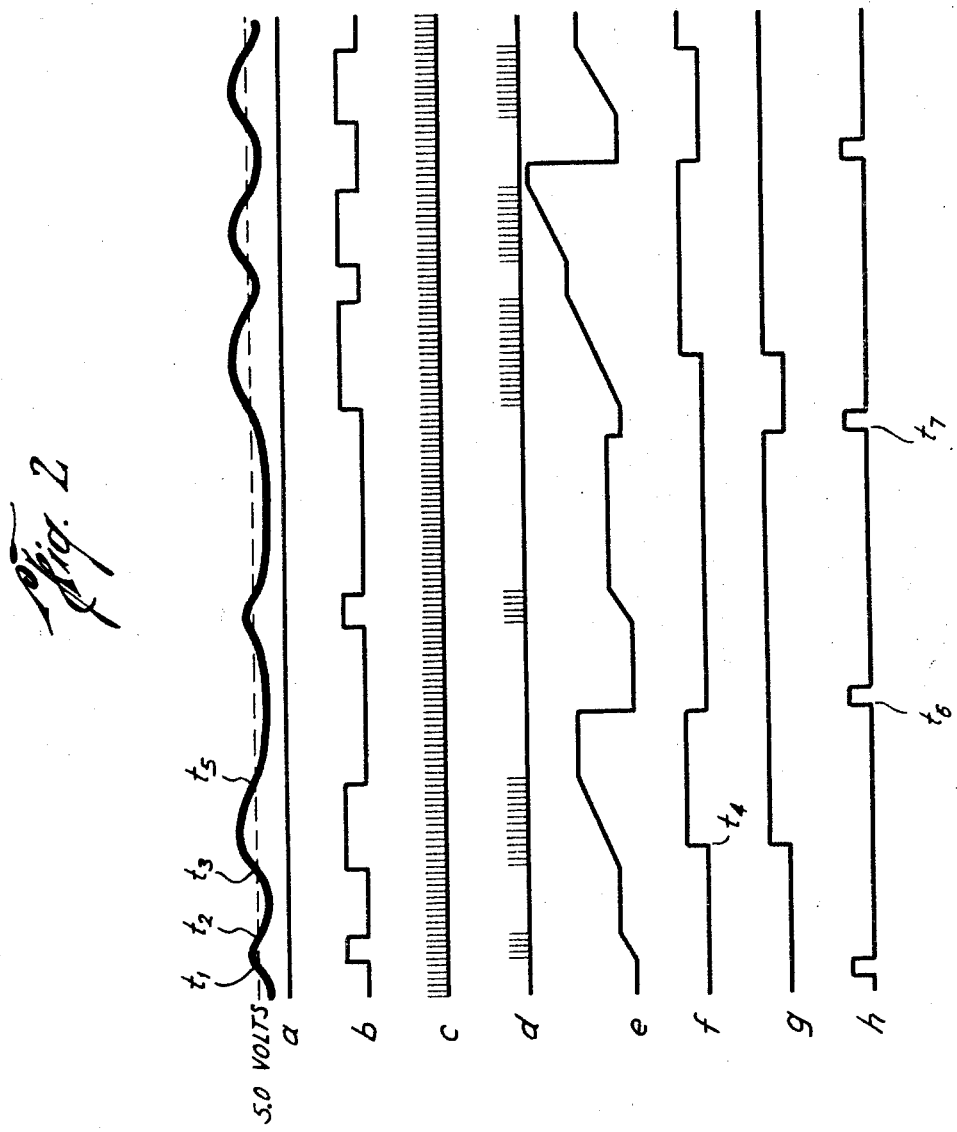

The advantage of this invention, both as to its construction and mode of operation, will be readily appreciated as the same become better understood by reference to the following detailed description when considered in connection with the accompanying drawings wherein:

FIG. 1 is a block diagram of the novel signal monitor system in accordance with this invention, and FIG. 2(a–h) are graphical displays showing the relationship of the various voltages in the system of FIG. 1.

Referring now to the drawings, there is shown in FIG. 1 a preferred embodiment of the signal monitor system wherein an input signal of varying amplitude, which is to be monitored, is applied to an input terminal 12. The input signal is coupled from the input terminal 12 to a first Schmitt trigger circuit 14 of a first channel and a second Schmitt trigger circuit 16 of a second channel. The Schmitt trigger circuit 14 contains a pair of output terminals 18, 22. When the input signal is greater than the threshold value of the Schmitt trigger circuit, an output signal appears at terminal 18. Conversely, when the threshold value is not exceeded, an output signal appears at terminal 22.

The output terminal 18 is coupled to a first input terminal of a first AND gate 24 and a first clock pulse source 26 is coupled to the second input terminal of the first AND gate 24. The output terminal of the first AND gate is coupled to the input terminal of a first counting circuit 28. A second clock pulse source 32 is coupled to the first counting circuit 28 and is used to reset the counting circuit at regular intervals. The output terminal of the counting circuit 28 is connected to the input terminal of a first flip-flop circuit 34, the output terminal 36 of the first flip-flop 34 being one of the output terminals of the signal monitor system.

The output terminal of the first counting circuit 28 is also connected to the input terminal of a first logical NOT circuit 38. The output terminal of the first logical NOT circuit 38 is connected to the first input terminal of a second AND gate 42, the second input terminal of the AND gate 42 having the second clock pulse source 32 connected thereto. Further, the output terminal of the AND gate 42 is connected to the first flip-flop 34.

The circuitry associated with the first channel is similar to that associated with the second channel. The Schmitt trigger circuit 16 of the second channel comprises a pair of output terminals 52, 54, the terminal 52 producing an output signal when the threshold level of the Schmitt trigger circuit 16 is exceeded and an output signal is present at the output terminal 54 when the threshold level of the trigger circuit is not exceeded. A third AND gate 56 has a first input terminal connected to the first clock pulse source 26 and a second input terminal connected to the output terminal 54 of the Schmitt trigger circuit 16.

The output terminal of the AND gate 56 is connected to the input terminal of a second counting circuit 58. The second clock pulse source 32 is also connected to the counting circuit 58. The output terminal of the counting circuit 58 is connected to the input terminal of a second flip-flop circuit 62 and the input terminal of a second logical NOT circuit 64. The output terminal of the logical NOT circuit 64 is connected to the first input terminal of a fourth AND gate 66 and the second clock pulse source 32 is connected to a second input terminal of the AND gate 66. The output terminal of the AND gate 66 is connected to the flip-flop circuit 62. Output signals are derived from the flip-flop circuit 62 at its output terminal 68. Further, the output terminal 36 of the first flip-flop 34 is connected to the flip-flop 62 so as to inhibit the second flip-flop 62 from producing an output signal at terminal 68 when an output signal is present at the terminal 36.

With the foregoing in mind, operation of the signal monitor system of FIG. 1, and with reference to the curves of FIGS. 2(*a–h*), is as follows:

With an input signal as depicted in FIG. 2(*a*) applied to the input terminal 12, and assuming that the first Schmitt trigger circuit 14 has a threshold level of 5 volts, when the input signal exceeds 5 volts an output pulse is produced at time $t_1$ at the output terminal 18 as depicted in FIG. 2(*b*) and applied to the first input terminal of the first AND gate 24. Simultaneously, pulses from the first clock pulse source, as depicted in FIG. 2(*c*), are continuously applied to the second input terminal of the AND gate 24. During the interval that a signal is present at both input terminals of the AND gate 24, the pulses from the clock pulse source 26 pass through the AND gate 24 and are applied to the input of the counting circuit 28, as depicted in FIG. 2(*d*). The count of counting circuit 28, which is shown in FIG. 2(*e*), linearly increases as the pulses are applied to the input of the counting ciruuit 28. The voltage shown in FIG. 2(*e*) is an internal voltage of the counter and represents the integrated count. The counting circuit or counter 28 is preferably a conventional type with an integrator and an output circuit which changes its output state when the integrated voltage reaches a specified value corresponding to the predetermined count.

At time $t_2$, when the input signal to terminal 12 drops below 5 volts, pulses from the clock source are no longer passed by the AND gate to the counting circuit 28. At time $t_3$, when the input pulse once again reaches a level of 5 volts, pulses from the clock source once again pass through the AND gate to the counting circuit. At time $t_4$, the clock pulses counted on the counting circuit 28 reach a sufficient level to cause the output of the counting circuit to change output states, as shown in FIG. 2(*f*) which represents the output signal from the counter output circuit. The change in output states of the counting circuit is applied to the flip-flop 34, causing the flip-flop to change conductive states and produce an output pulse at terminal 36, as shown in FIG. 2(*g*). At time $t_5$, when the input signal once again reaches a level below 5 volts, the counting circuit ceases to count. However, since the predetermined level of counts to change the output signal of the counting circuit has already been reached by the counting circuit during the interval, the output of the counting circuit does not change state.

The AND gate 42 produces an output signal, which causes the flip-flop 34 to be reset each time both an output signal from the second source of clock pulses (as shown in FIG. 2(*h*)) is applied to the second input terminal of the AND gate 42 and simultaneously the output signal at the counting circuit 28 is in its state where insufficient counts have been counted thereon to have changed its state. Thus, at time $t_6$, the second clock pulse source 32 produces an output pulse causing the counting circuit 28 to be reset and the output of the counting circuit reverts to its original output state. During the next interval, that is, from time $t_6$ through time $t_7$, the input signal at terminal 12 does not exceed the threshold level of 5 volts for a sufficient time and is, therefore, insufficient to cause the counting circuit 28 to change its output state. Therefore, at time $t_7$ when the next pulse from the clock pulse source 32 is applied to the AND gate 42, with the output of the counter at its original state, the output of the second AND gate 42 is activated producing an output signal which causes the flip-flop 34 to revert to its original state.

The second channel, comprising the Schmitt trigger circuit 16 and its associated circuitry, operates in a similar manner as the first channel. However, two differences are provided in the second channel so that the function of the output states at terminals 36 and 68 may be combined to provide useful information. First, the Schmitt trigger circuit 16 is set at a different discrete level than the Schmitt trigger circuit 14, such as 2.5 volts. Second, the output terminal 54, which is connected to an input terminal of the third AND gate 56, has an output signal present when the input signal at terminal 12 is below 2.5 volts. The terminal 52, which has an output signal present when the input signal at terminal 12 is above 2.5 volts, is not utilized in the embodiment as disclosed. Thus, with an input signal below 2.5 volts present for a predetermined interval at terminal 12, an output pulse will be produced at output terminal 68 of the second channel.

As an illustration, the channel containing the Schmitt trigger circuit 14 is operated so that an output signal is present at terminal 36 for an input signal exceeding 5 volts for at least 10 percent of the interval examined, that is, the interval between clock pulses from the second clock pulse source 32. The channel containing Schmitt trigger circuit 16 is operated so that an output signal is present at terminal 68 when the input signal at terminal 12 is less than 2.5 volts for 90 percent of the time for the same time interval. As can be readily seen, it is possible for certain input waveforms that both conditions may be satisfied and that the output of both channels would produce an output signal at terminal 36 and terminal 68 simultaneously. This condition is an ambiguous indication, and the output of one of the channels must be used to keep the other one from producing an output signal. By connecting the output of flip-flop circuit 34 to the flip-flop circuit 62, this inhibit connection prevents an output signal from being present at terminal 68 when an output signal is present at terminal 36.

Considering the Schmitt trigger circuit 14 set at a level of 5 volts and the Schmitt trigger circuit set at a level of 2.5 volts input, the output signals present at terminals 36 and 68 could, when used in combination with the chart below, be utilized to determine the approximate value of the input signal at the terminal 12.

| Mode | Input at terminal 12 for minimum period of time | Output Terminal 36 | Output Terminal 68 |
|---|---|---|---|
| I | Less than 2.5 volts at least 90% of the time. | Low | High. |
| II | Greater than 2.5 volts at least 10% the time and less than 5.0 volts at least 90% of the time. | Low | Low. |
| III | Greater than 5.0 volts at least 10% of the time. | High | Low. |

Use of the table above with the output signals at terminals 36 and 68 and standard circuitry can be used to change the gain of a controlled device as a function of the input amplitude.

While the two channels of the signal monitor system have been described, it would be obvious to one skilled in the art that a plurality of channels could be utilized to determine various discrete levels of the input signal.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A signal monitor system for producing output signals dependent upon the amplitude of an input electrical signal during each of a series of continuous intervals of time comprising:

a threshold signal means having a first output state when said input signal exceeds a predetermined threshold level and a second output state when said input signal does not exceed said threshold level;

a first clock pulse source;

an AND gate having a first input terminal, a second input terminal, and an output terminal;

means for applying said threshold signal means output and said first clock pulses to said AND gate input terminal and second input terminal, respectively;

a counting circuit having an input terminal coupled to said AND gate output terminal, an output terminal, and a reset terminal, said counting circuit having a first output signal when said input signal exceeds said threshold level for a predetermined amount of said interval of time and having a second output signal when said input signal does not exceed said threshold level for said predetermined amount of said interval of time although it may exceed said threshold level for less than said predetermined amount of said interval of time; and means comprising a second clock pulse source coupled to said counting circuit reset terminal for resetting said counting circuit at the end of said interval of time to produce said second output signal.

2. A signal monitor system for producing output signals dependent upon the amplitude of an input electrical signal during an interval of time comprising:

a first threshold signal means having a first output state when said input signal exceeds a first threshold level and a second output state when said input signal does not exceed said first threshold level;

a first clock pulse source;

a first AND gate having a first input terminal, a second input terminal, and an output terminal;

means for applying said first threshold signal means output and said first clock pulse source to said first AND gate first input terminal and second input terminal, respectively;

a first counting circuit having an input terminal coupled to said first AND gate output terminal, an output terminal, and a reset terminal, said first counting circuit having a first output signal when said input signal exceeds said first threshold level for a first predetermined amount of said interval of time and having a second output signal when said input signal does not exceed said first threshold level for said first predetermined amount of said interval of time;

means for resetting said first counting circuit at the end of said interval of time to said second output signal comprising a second clock pulse source coupled to said counting circuit reset terminal;

flip-flop circuit means for producing a first system output signal having an input terminal and an output terminal and a reset terminal, said first counting circuit output terminal being coupled to said input terminal of said last mentioned means, said first system output signal having a first output state and a second output state, said first output state being produced when said system input signal exceeds said first threshold level for said first predetermined amount of said interval of time, and said second output state being produced when said system input signal does not exceed said first threshold level for said first predetermined amount of said interval of time;

a first system output signal resetting means having an input means and an output means for producing said first system output signal second output state when said first counting circuit produces said second output signal during the entire interval of time, and wherein said first system output signal resetting means comprises:

a first logical NOT circuit having an input terminal and an output terminal;

a second AND gate having a first input terminal, a second input terminal, and an output terminal;

means coupling said output terminal of said first counting circuit to said input terminal of said first NOT circuit and means coupling said output terminal of said first NOT circuit to said first input terminal of said second AND gate circuit;

means coupling said second clock pulse source to said second input terminal of said second AND gate; and means coupling said output terminal of said second AND gate to said reset terminal of said flip-flop circuit means.

3. A signal monitor system in accordance with claim 2 and further comprising:

a second threshold signal means having a first output state when input signal exceeds a second threshold level and a second output state when said input signal does not exceed said threshold level;

a third AND gate having a first input terminal, a second input terminal, and an output terminal;

means for applying said second threshold signal means output and said first clock pulse source to said third AND gate first input terminal and second input terminal, respectively;

a second counting circuit having an input terminal, an output terminal and a reset terminal, means coupling said third AND gate output terminal to said second counting circuit input terminal, said second counting circuit having a first output signal when said input signal exceeds said second threshold level for a second predetermined amount of said interval of time and having a second output signal when said input signal does not exceed said second threshold level for said second predetermined amount of said interval of time;

means coupling said second clock pulse source to said second counting circuit reset terminal;

means for producing a second system output signal having an input terminal, an output terminal, and a reset terminal, said second counting output terminal being coupled to said input terminal of said last mentioned means, said second system output signal having a first output state and a second output state, said first output state being produced when said system input signal exceeds said second threshold level for said second predetermined amount of said interval of time and said second output state being produced when said system input signal does not exceed said second threshold level for said second predetermined amount of said interval of time;

a second system output signal resetting means having an input means and an output means for producing said second system output signal first output state when said second counting circuit output signal produces said first output signal during the entire interval of time, said second clock pulse source and said second counting circuit output terminal being coupled to said input means, and said output means being coupled to said second system output signal producing means reset terminal; and inhibit means coupling said first system output signal producing means output terminal to said second system output signal producing means for preventing said second system output signal producing means from producing said second system output signal second output state when said first output state is produced by said first system output signal producing means.

4. A system for monitoring the amplitude of an input signal and producing output signals indicating the proportionate time the input signal is within discrete amplitude ranges during each of a series of continuous time intervals, said system comprising:

a threshold signal means having a first output state when said input signal exceeds a specified threshold voltage level, and a second output state when said input signal does not exceed said threshold level;

a first clock pulse source;

a pulse counting circuit means having an input terminal, an output terminal, and a reset terminal;

means operatively associated with said threshold signal means and said first clock pulse source for applying said clock pulses to said pulse counting circuit means input terminal to be counted thereby whenever the input signal exceeds said specified threshold level, said pulse counting circuit means producing a first output state whenever the count of pulses by the counting circuit means during each of said time intervals exceeds a predetermined amount and producing a second output state whenever the count by the counting circuit means during each of said time intervals is less than said predetermined amount although said input signal may exceed said threshold level for less than said predetermined count during a specific time interval;

reset means for resetting said counting circuit means at the end of each said specific time interval, said reset means comprising a second clock pulse source coupled to said counting circuit reset terminal whereby the pulses from said second clock pulse source are applied to said counting circuit reset terminal and the time intervals between said second clock pulses define said series of continuous time intervals;

flip-flop circuit means coupled to the output terminal of said pulse counting circuit means and operatively associated with said pulse counting circuit means for producing a system output signal, said system output signal having a first output state and a second output state, said first output state being produced whenever said input signal exceeds said specified threshold level for said predetermined count within each specific time interval of said series of continuous time intervals, and said second output state being produced when said counting circuit means produces its second output state throughout the entire time interval; and means for resetting said flip-flop circuit means to produce the second output state of said system output signal when said pulse counting circuit means produces its second output state throughout said time interval.

5. A signal monitor system as described in claim 4 and further including:

a second threshold signal means having a first output state when said input signal exceeds a second threshold voltage level and a second output state when said input signal does not exceed said second threshold level;

a second pulse counting circuit having an input terminal, and output terminal, and a reset terminal;

means operatively associated with said second threshold signal means and said first clock pulse source for applying the pulses from said first clock pulse source to said second pulse counting circuit means input terminal to be counted thereby whenever said input signal does not exceed said second threshold level, said second pulse counting circuit means producing a first output state during each of said time intervals whenever said input signal exceeds said second threshold level for a second predetermined count by said second counting circuit means and producing a second output state during each of said time intervals when said input signal does not exceed said second threshold level for said second predetermined count by said second counting circuit means;

second flip-flop circuit means coupled to the output terminal of said second pulse counting circuit means and operatively associated with said second pulse counting circuit means for producing a second system output signal, said second system output signal having a first output state whenever the input signal exceeds said second threshold level for said predetermined count within each specified time interval, and said second system output signal having a second output state when the input signal does not exceed said second threshold level for said predetermined count within each specific time interval; and means for applying said second clock pulses to the reset terminal of said second pulse counting circuit means whereby said second pulse counting circuit means is reset at the end of each said specific time interval.

References Cited

UNITED STATES PATENTS

| 2,717,994 | 1955 | Dickinson et al. | 340—347 |
| 2,759,784 | 1956 | Burke | 340—347 |
| 2,836,356 | 1958 | Forrest et al. | 340—347 |
| 2,840,806 | 1958 | Bateman | 340—347 |
| 2,946,010 | 1960 | Hornoch | 328—116 |
| 3,214,700 | 10/1965 | Hook | 328—151 |

ARTHUR GAUSS, Primary Examiner

H. DIXON, Assistant Examiner

U.S. Cl. X.R.

328—151